United States Patent
Leroy

(10) Patent No.: US 10,132,718 B2
(45) Date of Patent: Nov. 20, 2018

(54) VEHICLE COMPUTER AND CRANKSHAFT SENSOR TYPE DETECTING METHOD

(71) Applicants: CONTINENTAL AUTOMOTIVE FRANCE, Toulouse (FR); CONTINENTAL AUTOMOTIVE GMBH, Hannover (DE)

(72) Inventor: Yannick Leroy, Toulouse (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 76 days.

(21) Appl. No.: 15/508,431

(22) PCT Filed: Aug. 24, 2015

(86) PCT No.: PCT/EP2015/001725
§ 371 (c)(1),
(2) Date: Mar. 2, 2017

(87) PCT Pub. No.: WO2016/034273
PCT Pub. Date: Mar. 10, 2016

(65) Prior Publication Data
US 2017/0307476 A1     Oct. 26, 2017

(30) Foreign Application Priority Data
Sep. 4, 2014   (FR) ..................... 14 58273

(51) Int. Cl.
*G01M 15/06*   (2006.01)
*G01D 5/14*    (2006.01)

(52) U.S. Cl.
CPC .............. *G01M 15/06* (2013.01); *G01D 5/14* (2013.01)

(58) Field of Classification Search
CPC .................................. G01M 15/06; G01D 5/14
See application file for complete search history.

(56) References Cited

U.S. PATENT DOCUMENTS

| | | | |
|---|---|---|---|
| 7,814,780 B2 * | 10/2010 | Bowling | F02D 41/009 73/114.26 |
| 8,963,615 B1 * | 2/2015 | Abawi | H03K 17/161 327/415 |

(Continued)

FOREIGN PATENT DOCUMENTS

| | | |
|---|---|---|
| EP | 2 546 088 A1 | 1/2013 |
| WO | 2014/120398 A1 | 8/2014 |

OTHER PUBLICATIONS

International Search Report, dated Oct. 28, 2015, from corresponding PCT application.

*Primary Examiner* — Freddie Kirkland, III
(74) *Attorney, Agent, or Firm* — Young & Thompson

(57) ABSTRACT

A motor vehicle computer includes an input port connected to a crankshaft sensor and a module for processing signals received from the crankshaft sensor. The computer includes: a first adapting module, suited to making the signals, provided by a crankshaft sensor of a first type, conform to an input predefined format of the processing module; a second adapting module, suited to making the signals, provided by a crankshaft sensor of a second type, conform to the input format of the processing module; a routing unit suited to connecting the input port to the first or to the second adapting module; a unit for detecting the type of the crankshaft sensor connected to the input port; and a unit for commanding the routing unit according to the type of crankshaft sensor detected.

7 Claims, 1 Drawing Sheet

(56) References Cited

U.S. PATENT DOCUMENTS

Figure 1:
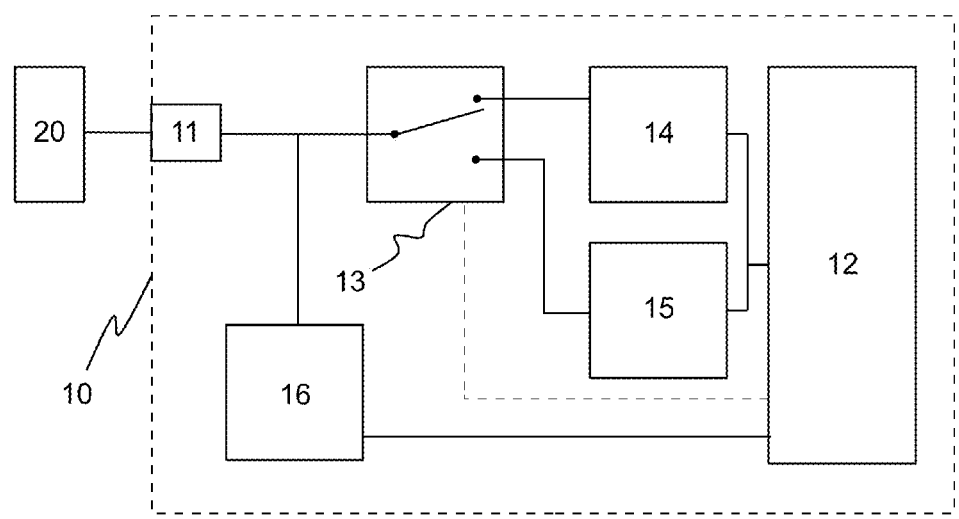

| | | | |
|---|---|---|---|
| 9,347,801 B2* | 5/2016 | Ozaki | G01D 5/2451 |
| 9,939,410 B2* | 4/2018 | Grambichler | G01N 27/82 |
| 2009/0096599 A1 | 4/2009 | Kranz | |
| 2012/0330490 A1* | 12/2012 | Ozaki | G01D 5/2451 |
| | | | 701/22 |

* cited by examiner

VEHICLE COMPUTER AND CRANKSHAFT SENSOR TYPE DETECTING METHOD

The present invention relates to the field of motor vehicle computers, and more particularly to the connection of a crankshaft sensor (also known as a "crank sensor") to a motor vehicle computer.

Crankshaft sensors are used, for example, in current heat engine motor vehicles for accurately determining the angular position of the crankshaft, which angular position can be used to determine, in particular, the position of the various pistons in the engine cycle of an internal combustion engine known as a four stroke (intake stroke, compression stroke, combustion stroke, then exhaust stroke).

In a known manner, a crankshaft sensor is associated with a target rigidly connected to a crankshaft connected to the piston(s) of the internal combustion engine by means of a connecting rod. This target is generally in the form of a disc, the periphery of which is toothed. Generally, these teeth have a height that is the same but spacings and lengths which are not all identical, such as to code the angular positioning of the target.

Several types of crankshaft sensors are known and used in current motor vehicles.

For example, it is known to use a variable reluctance sensor as a crankshaft sensor. In a known manner, a variable reluctance sensor is a passive sensor which, associated with a ferromagnetic target rigidly connected to the crankshaft, mainly includes means for measuring the air gap between said measuring means and the target, which air gap varies over the course of time with the rotation of said target and of the passage of the teeth of the target in front of the sensor. The magnetic field measuring means form a curved analog signal representing the variations in the magnetic field over time.

It is also known to use a Hall effect sensor as a crankshaft sensor. In a known manner, a Hall effect sensor is an active sensor including a magnetic field generator and means for measuring the magnetic field formed by said generator, which varies over the course of time with the rotation of the target and of the passage of the teeth of the target in front of the sensor. Known Hall effect sensors further include an electronic circuit for processing the signal measured by the means for measuring the magnetic field, which forms a square wave digital signal representing the shape of the teeth of the target that is time-indexed.

In all cases, the signal formed by a crankshaft sensor is provided to a processing module which must deduce, from said signal, the angular position of the crankshaft.

Due to the various types of crankshaft sensors possible, several formats are possible for the formed signals:
 a curved analog signal representing the magnetic field variations over time in the case of a variable reluctance sensor,
 a square wave digital signal representing the shape of the teeth of the target that is time-indexed in the case of a Hall effect sensor.

For these reasons, the current motor vehicle computers are specialized according to the crankshaft sensor type. Thus, firstly, there are specialist computers for variable reluctance sensors and, secondly, specialist computers for Hall effect sensors. More generally, these are analog output signal sensors and digital output signal sensors.

The aim of present invention is to overcome all or some of the limitations of the prior art solutions, particularly those disclosed above, by proposing a solution that allows for motor vehicle computers compatible with several types of crankshaft sensors.

To this end, and according to a first aspect, the invention relates to a motor vehicle computer including an input port connected to a crankshaft sensor and a module for processing signals received from said crankshaft sensor, characterized in that said computer includes:
 a first adapting module, suited to making the signals, provided by a crankshaft sensor of a first type, conform to an input predefined format of the processing module,
 a second adapting module, suited to making the signals, provided by a crankshaft sensor of a second type, conform to said input format of the processing module,
 routing means suited to connecting the input port to the first adapting module or to the second adapting module,
 means for detecting the type of the crankshaft sensor connected to the input port, and
 means for commanding the routing means according to the type of crankshaft sensor detected.

Thus, according to the invention, a same computer input port is used to connect the crankshaft sensor regardless of the type of said crankshaft sensor. The input port of said computer is then connected, depending on the type of crankshaft sensor, either to a first adapting module or to a second adapting module which both output a signal in a same format. In this way, the processing module always receives signals in a same format, regardless of the type of the crankshaft sensor connected to the input port.

In addition, the computer can automatically and dynamically detect the type of crankshaft sensor connected to the input port. However, in other examples, there is nothing to prevent configuring, in the production stage, the routing means, in a static manner, if the type of crankshaft sensor which will then be connected to the computer is already known.

In particular embodiments, the computer can further include one or more of the following features, taken separately or in all technically possible combinations.

According to one variant of the invention, one of the crankshaft sensors corresponds to a variable reluctance sensor.

According to another variant of the invention, the other crankshaft sensor (20) corresponds to a Hall effect sensor.

According to a preferred embodiment, the detecting means include a diagnostic module for the crankshaft sensor. Such arrangements are advantageous in that the detection of the crankshaft sensor type uses no or few dedicated additional hardware components. Indeed, said detection uses a diagnostic module which must be present in the computer to monitor, on a recurring basis, that said crankshaft sensor operates properly.

In a particular variant, the diagnostic module takes the form of a resistance bridge connected to the input port of the computer, the midpoint of which is connected to the processing module that analyzes the voltage level of the midpoint of the resistance bridge, and compares it with reference values previously stored in an electronic memory of the processing module.

In a second aspect of the invention, the latter relates to a crankshaft sensor type detecting method for a computer according to the above features, including a step for diagnosing the crankshaft sensor by considering said crankshaft sensor as being of the first type and:

when a normal behavior for a crankshaft sensor of the first type is detected during the diagnostic step, the crankshaft sensor connected to the computer is detected as being of the first type, when an abnormal behavior for a crankshaft sensor of the first type is detected during the diagnostic step, the crankshaft sensor connected to the computer is considered to be of the second type.

Advantageously, when an abnormal behavior for a crankshaft sensor of the first type has been detected during the diagnostic step, a step for checking that the crankshaft sensor is of the second type is initiated.

Advantageously again, the mentioned checking step corresponds to a diagnosis of the crankshaft sensor by considering said crankshaft sensor as being of the second type.

Figure 2:
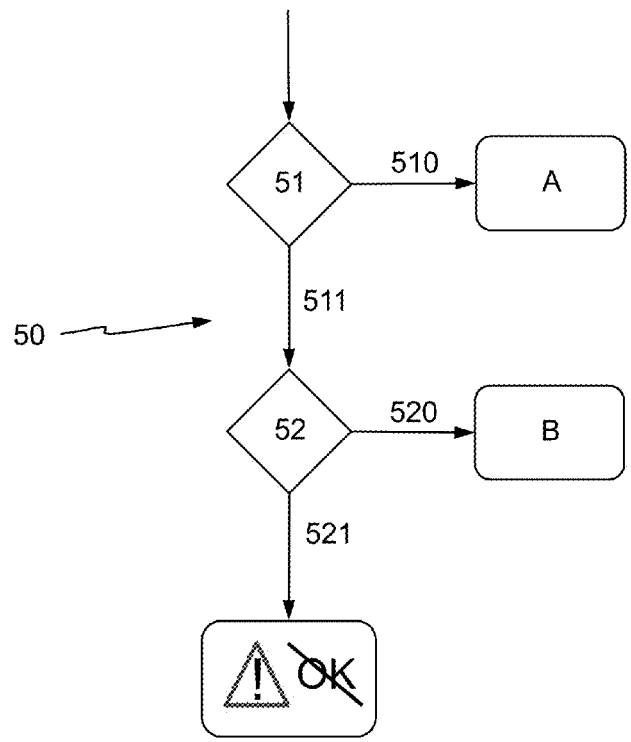

The invention will be better understood from reading the following description, given by way of non-limiting example, and with reference to the figures in which:

FIG. 1 is a schematic representation of an exemplary embodiment of a computer incorporating the invention, FIG. 2 is a diagram illustrating the main steps of a crankshaft sensor type detecting method according to the invention.

In these figures, references that are identical from one figure to another denote identical or similar elements. For reasons of clarity, the elements shown are not to scale, unless otherwise specified.

FIG. 1 schematically shows an exemplary embodiment of a motor vehicle electronic computer 10.

As illustrated by FIG. 1, the computer 10 includes, in particular, an input port 11, connected to a crankshaft sensor 20, and a module 12 for processing the signals received on said input port 11.

The following description considers, in a non-limiting manner, the case where the crankshaft sensor 20 is associated with a target (not shown in the figures) rigidly connected to a crankshaft connected to at least one piston of a heat engine of the motor vehicle. In such a configuration, the crankshaft sensor 20 is used, in a conventional manner, to determine the angular position of the crankshaft and deduce therefrom, for example, the position of the piston in the engine cycle thereof.

The processing module 12 carries out a predefined set of operations, that are outside the scope of the invention and will not be detailed here, to determine the angular position of the crankshaft.

The processing module 12 includes, for example, at least one processor and at least one electronic memory in which a computer program is stored, as a set of program code instructions to be executed in order to determine the angular position of the crankshaft from the signals received from the crankshaft sensor 20. In a variant, the processing module 12 alternatively or additionally includes one or more programmable logic circuits, of the FPGA, PLD, etc. type, and/or application-specific integrated circuits (ASIC) suited to implementing all or some of the operations required to determine, from the signals received from the crankshaft sensor 20, the angular position of the crankshaft.

In other words, the processing module 12 includes a set of means configured using software (specific computer program) and/or hardware (FPGA, PLD, ASIC, etc.) to process the signals received from the crankshaft sensor 20.

An input format is predefined for the signals to be processed by the processing module 12. From these signals, the processing module 12 determines the angular position of the crankshaft by considering that the signals of the crankshaft sensor 20 are received in the predefined input format.

As illustrated by FIG. 1, the computer 10 further includes routing means suited to connecting the input port 11 of the computer 10 either to a first adapting module 14, or to a second adapting module 15. In the nonlimiting example illustrated by FIG. 1, the routing means include a demultiplexer circuit 13.

The first adapting module 14 is suited to making the signals, provided by a crankshaft sensor 20 of a first type A, conform to the input predefined format of the processing module 12.

The second adapting module 15 is suited to making the signals, provided by a crankshaft sensor 20 of a second type B, conform to the input predefined format of the processing module 12.

Crankshaft sensors 20 of different types generally provide signals in different respective formats. For example, as indicated above, a variable reluctance sensor provides a curved analog signal representing the variations in the magnetic field over time, while a Hall effect sensor provides a square wave digital signal representing the shape of the teeth of the target that is time-indexed.

Given that the first and second adapting modules 14, 15 are suited to making the signals provided by crankshaft sensors of different respective types conform to the input format of the processing module 12, said computer 10 is compatible with several types of crankshaft sensors.

The following description considers, in a non-limiting manner, the case where the first type A of crankshaft sensor 20 corresponds to a variable reluctance sensor delivering an analog signal, and where the second type B of crankshaft sensor 20 corresponds to a Hall effect sensor delivering a digital signal.

In such a case, the crankshaft sensor 20, connected to the input port 11 of the computer 10, can equally be a variable reluctance sensor or a Hall effect sensor. If the crankshaft sensor 20 is a variable reluctance sensor, the demultiplexer circuit 13 is commanded such as to connect the input port 11 to the first adapting module 14. If, on the contrary, the crankshaft sensor 20 is a Hall effect sensor, the demultiplexer circuit 13 is commanded such as to connect the input port 11 to the second adapting module 15.

The first adapting module 14 is configured to transform the curved analog signal provided by a variable reluctance sensor in order to obtain a signal having the predefined input format of the processing module 12.

Similarly, the second adapting module 15 is configured to transform the square wave digital signal provided by a Hall effect sensor in order to obtain a signal having the predefined input format of the processing module 12.

Nothing prevents the predefined input format of the processing module 12 from matching the format of the signals provided by one of the types of crankshaft sensors supported. For example, the predefined input format of the processing module 12 can match the format of the square wave digital signal provided by a Hall effect sensor, in which case the second adapting module 15 can be straightforward. The second adapting module 15 can, in this case, consist of an electric line connecting the demultiplexer circuit 13 to the processing module 12, or of filtering means for removing interfering signals which may be present in the signal provided by the Hall effect sensor.

The routing means, i.e. the demultiplexer circuit 13 in the example illustrated by FIG. 1, can be statically configured to connect the input port 11 to either of the first and second adapting modules 14, 15. For example, if it is known at the production stage of the computer 10 that the crankshaft sensor 20 which will be connected to the input port 11 is a Hall effect sensor, then the routing means can be statically configured to connect the input port 11 to the second adapting module 15. "Statically" means that the computer 10 can no longer, barring external intervention on said computer 10 (software update, etc.), modify the configuration of the routing means by itself.

In preferred embodiments, the computer 10 includes means for detecting the type of the crankshaft sensor 20 connected to the input port 11, and means for commanding the demultiplexer circuit 13 depending on the detected type of the crankshaft sensor 20.

As a result of the detecting means, the computer 10 can automatically determine, without external intervention, the type of the crankshaft sensor 20 connected to the input port 11, and command the demultiplexer circuit 13 into the appropriate position based on the detected type.

The detecting means can be means dedicated to detecting the type of the crankshaft sensor 20, and take any suitable form for this purpose. A disadvantage is that such detection-dedicated means will be typically implemented only once during the life of the computer 10, at the first start-up of said computer 10 after the crankshaft sensor 20 has been connected to the input port 11, or optionally later if the crankshaft sensor 20 is changed during the life of the vehicle. To envisage installing a device dedicated to this detection purpose is then a prohibitive cost.

In preferred embodiments, and as illustrated by FIG. 1, the detecting means include a diagnostic module 16 for the crankshaft sensor 20. In addition, in the nonlimiting example illustrated by FIG. 1, the command means correspond to the processing module 12.

Indeed, it is necessary to associate diagnostic modules with the various sensors of a motor vehicle, in order to check, on a recurring basis, that each sensor is operating properly. The detection then uses a diagnostic module which must be present in the computer. Thus, the diagnostic module 16 for the crankshaft sensor 20 is advantageously used to determine the type of said crankshaft sensor 20. Thus, the number of additional hardware components dedicated to detecting the crankshaft sensor 20 type is very small, or even zero if the modifications are software-related only.

The diagnostic module 16 can take any suitable form, for example a resistance bridge connected to the input port 11 of the computer 10, the midpoint of which is connected to the processing module 12. The processing module 12 can therefore diagnose the crankshaft sensor 20 by analyzing the voltage level of the midpoint of the resistance bridge, and by comparing this voltage level with the reference values previously stored in an electronic memory of the processing module 12.

FIG. 2 schematically shows the main steps of a crankshaft sensor 20 type detecting method 50, implemented by the computer 10 of FIG. 1.

As illustrated by FIG. 2, the detecting method 50 firstly includes a step 51 for diagnosing the crankshaft sensor 20 by considering it as being a variable reluctance sensor.

This diagnostic step 51 corresponds, in the aforementioned example, to measuring the voltage level of the resistance bridge of the diagnostic module 16 and comparing it with reference values previously stored in an electronic memory of the processing module 12. Several reference values are preferably stored:
- at least one expected value for a normal behavior of a variable reluctance sensor,
- at least one expected value for an abnormal behavior of a variable reluctance sensor.

It should be noted that an abnormal behavior of a variable reluctance sensor can correspond, in the context of the invention, to various scenarios:
- the crankshaft sensor 20 connected to the input port 11 is not a variable reluctance sensor,
- the crankshaft sensor 20 connected to the input port 11 is a variable reluctance sensor, but is failing or a bad connection exists on the input port 11 (open circuit, ground or battery short circuit).

However, the detection of failure of the crankshaft sensor 20 or of a bad connection on the input port 11 is outside the scope of the invention, such that it is not considered hereafter. It will be noted, however, that the processing module 12 can store several reference values associated with an abnormal behavior of a variable reluctance sensor, corresponding to a failure of a variable reluctance sensor and to the presence of a crankshaft sensor which is not a variable reluctance sensor, respectively.

As illustrated by FIG. 2, when a normal behavior for a variable reluctance sensor is detected during the diagnostic step 51 (reference 510 in FIG. 2), then the crankshaft sensor 20 connected to the computer 10 is detected as being a variable reluctance sensor, of the first type A in the present example.

If, on the contrary, an abnormal behavior for a variable reluctance sensor is detected during the diagnostic step 51 (reference 511 in FIG. 2), then the crankshaft sensor 20 connected to the computer 10 is considered to be a Hall effect sensor, of the second type B in the present example.

Following the detection of an abnormal behavior for a variable reluctance sensor during the diagnostic step 51, it can be considered, without additional checking, that the crankshaft sensor 20 connected to the input port is a Hall effect sensor. However, as illustrated by FIG. 2, the detecting method 50 preferably includes a step 52 for checking that the crankshaft sensor 20 is indeed a Hall effect sensor.

Preferably, the checking step 52 includes the diagnosis of the crankshaft sensor 20 by considering, on this occasion, that it is a Hall effect sensor. Advantageously, the diagnosis of the crankshaft sensor 20, by considering that it is a Hall effect sensor, uses the diagnostic module 16. If necessary, the processing module 12 can further store reference values including:
- at least one expected value for a normal behavior of a Hall effect sensor,
- at least one expected value for an abnormal behavior of a Hall effect sensor.

As illustrated by FIG. 2, when a normal behavior for a Hall effect sensor is detected during the checking step 52 (reference 520 in FIG. 2), then the crankshaft sensor 20 connected to the computer 10 is confirmed as being a Hall effect sensor, of the second type B in the present example.

If, on the contrary, an abnormal behavior for a Hall effect sensor is detected during the checking step 52 (reference 521 in FIG. 2), then the crankshaft sensor 20 connected to the calculator 10 is, for example, considered to be failing, without being able to reach a conclusion on the type thereof.

More generally, it should be noted that the implementation methods and embodiments considered above have been described as non-limiting examples, and other variants are therefore possible.

In particular, the invention has been described by considering that the computer 10 was compatible only with two types of crankshaft sensors. Nothing prevents, in other examples, having a computer 10 that is compatible with a greater number of crankshaft sensor types. For example, a computer 10 compatible with three types of crankshaft sensors is obtained by adding a third adapting module, and with routing means suited to connecting the input port 11 of said computer 10 to any one of the first, second and third adapting modules.

The invention claimed is:

1. A motor vehicle computer (10) including an input port (11) connected to a crankshaft sensor (20) and a module (12) for processing signals received from said crankshaft sensor, the computer comprising:
- a first adapting module (14), suited to making the signals, provided by a crankshaft sensor of a first type (A), conform to an input predefined format of the processing module (12),
- a second adapting module (15), suited to making the signals, provided by a crankshaft sensor of a second type (B), conform to said input format of the processing module (12),
- routing means (13) suited to connecting the input port (11) to the first adapting module (14) or to the second adapting module (15),
- means for detecting the type of the crankshaft sensor (20) connected to the input port (11), and
- means for commanding the routing means (13) according to the type of crankshaft sensor (20) detected.

2. The computer (10) as claimed in claim 1, wherein one of the crankshaft sensors (20) corresponds to a variable reluctance sensor.

3. The computer (10) as claimed in claim 2, wherein the other crankshaft sensor (20) corresponds to a Hall effect sensor.

4. The computer (10) as claimed in claim 3, wherein the detecting means include a diagnostic module (16) for the crankshaft sensor.

5. The computer (10) as claimed in claim 2, wherein the detecting means include a diagnostic module (16) for the crankshaft sensor.

6. The computer (10) as claimed in claim 1, wherein the detecting means include a diagnostic module (16) for the crankshaft sensor.

7. The computer (10) as claimed in claim 6, wherein the diagnostic module (16) takes the form of a resistance bridge connected to the input port (11) of the computer (10), the midpoint of which is connected to the processing module (12) that analyzes the voltage level of the midpoint of the resistance bridge, and compares it with reference values previously stored in an electronic memory of the processing module (12).

\* \* \* \* \*